United States Patent [19]

Stephan

[11] 4,063,044
[45] Dec. 13, 1977

[54] LIGHT RESPONSIVE MONITORING SYSTEM
[75] Inventor: Edward R. Stephan, Manassas, Va.
[73] Assignee: The United States of America as represented by the Secretary of the Treasury, Washington, D.C.
[21] Appl. No.: 650,650
[22] Filed: Jan. 20, 1976
[51] Int. Cl.² .................................. H04M 1/22
[52] U.S. Cl. ........................... 179/81 C; 179/1 MN
[58] Field of Search .............. 179/1 MN, 2 R, 2 A, 179/7 R, 81 R, 81 C, 84 R, 84 L; 330/59; 317/130; 340/228 S, 251

[56] References Cited
U.S. PATENT DOCUMENTS

| | | | |
|---|---|---|---|
| 2,309,329 | 1/1943 | Powers | 317/130 |
| 3,566,044 | 2/1971 | Cross | 179/84 L |
| 3,590,161 | 6/1971 | Jacobs | 179/7 R |
| 3,632,892 | 1/1972 | McLaughlin | 179/81 C |
| 3,665,111 | 5/1972 | Schieser | 179/81 C |

Primary Examiner—Kathleen H. Claffy
Assistant Examiner—Joseph A. Popek

[57] ABSTRACT

A system for monitoring the volume of traffic on telephone lines or in a data acquisition system as a function of time using photocells responsive to the aggregate visual light output of pilot light displays utilized in the telephone or data systems. An array of photocells is positioned over the pilot light display so as not to interfere with its visibility by an operator. The output of the photocell array is coupled to a recording device which records the instantaneous output sum of the photocells but which is insensitive to ambient light conditions of the surrounding environment or to transient light conditions of the sources to be monitored. Means are also provided for triggering an alarm when a predetermined voltage level is attained which provides an indication of the condition when all lines are in use.

2 Claims, 8 Drawing Figures

LIGHT RESPONSIVE MONITORING SYSTEM

Private businesses or government agencies which maintain and use a plurality of telephone lines frequently need to know the volume of usage of these telephone lines as a function of time. For example, an agency or office which dispenses information over the telephone must maintain a large bank of telephone lines and frequently finds that at certain times the traffic on these telephone lines reaches such a volume that all lines are busy. Sometimes, it is also desirable to know the amount of traffic that a particular number or a particular line is handling during a given period of time. For example, requests for information relating generally to the United States Government are handled by the Federal Information Center (FIC). Frequently calls are transferred to the FIC from the Metro Centrex Directory Information Operation. An "FIC All Busy" alarm or indicator installed at Metro Centrex would save valuable dialing time which is now being wasted by Metro operators attempting to transfer call to the FIC only to find its lines busy.

Additionally an automatic recording of the volume of calls incoming to the Metro Centrex Operation throughout the day is essential in order to adequately analyze the telecommunications facilities performance and to provide a detailed indication of operator workload.

Modern telephones systems utilize visual displays to indicate when a line is in use. Thus, the translucent push-buttons on a conventional business or office telephone become lighted when the line is in use and may be monitored in accordance with the invention to provide an "all busy" indication and to record the volume of use as a function of time.

Many systems employ the use of photocells for controlling the operation of machinery or for monitoring the light intensity of various sources. Examples of these types of systems may be found in the U.S. Pat. Nos. to Zielinski 3,348,104, Powers, 2,309,329 and Martens, 3,230,469. None of the above systems, however, are suitable for the monitoring of telephone or data bank systems. Systems are commercially available which monitor traffic of telephone or data systems lines; however, these systems are connected internally, are expensive and complex, and must frequently be custom built. Additionally, most communications common carriers impose restrictions on the electrical interconnection of customer-provided equipment with their own systems.

In accordance with the present invention, an array of photocells inserted into movable pistons may be positioned by means of mounting brackets over the lighted push-buttons of a conventional telephone in direct contact such that the telephone operator is able to see the visual indication and use the pistons to operate the telephone push-buttons. The photocells are mounted in plastic shims which may easily be inserted into a hollow portion of the pistons with the photocell element pointing directly at the light source on the telephone. Ambient light conditions do not effect the monitoring effect of the photocells due to a feature of the circuitry involved. This feature comprises a potentiometer which allows one to adjust the triggering point of an electronic switch which controls the "all busy" alarm. By making this adjustment under normal ambient light conditions, these conditions will be effectively compensated for and the photocell output will be independent of ambient light. Another feature of the invention is that the alarm is not responsive to rapid fluctuations in either the ambient light level or the primary source light level. Fluctuation may occur for example when a telephone line is placed on "hold." To alleviate this effect a filter is provided which passes only the average energy content of the fluctuating light.

Additionally, the invention may be used to monitor data acquisition systems which use a visual light display such as an array of light emitting diodes. An inexpensive means is provided whereby the photocell array may be clamped over the light emitting diode by means of a cylindrical or doughnut shaped magnet. The magnet has a clear plastic shim contained concentrically within it and the photocell fits within the clear plastic shim, thus permitting the viewer to use the monitoring system without hampering the visual indication.

It is, therefore, an object of this invention to provide a traffic monitoring system for communications or data installations systems which utilize visual displays as circuit traffic indicators.

It is another object of this invention to provide a means for externally positioning an array of photocell monitors over visual light indicators without the need of internal connections therewith.

It is a still further object of this invention to provide a means for monitoring visual light displays, telephone or data communications equipment without hindering the ability of the viewer to perceive the visual indication.

It is a still further object of this invention to provide a circuit for monitoring the amount of traffic in a data communication system or telephone system which will automatically compensate for the ambient light conditions of the environment in which the system operates.

A still further object of this invention is to provide a circuit for use in a monitoring system for telephone and data communications equipment having visual light displays which is immune from the effects of the flickering or pulsing of the light sources to be monitored.

A still further object of this invention is to provide a monitoring system for data communications or telephone equipment which will indicate a saturation condition for all telephone lines or data channels.

Other objects or features of the invention will become apparent from the drawings enclosed herein of which:

Figure 1:
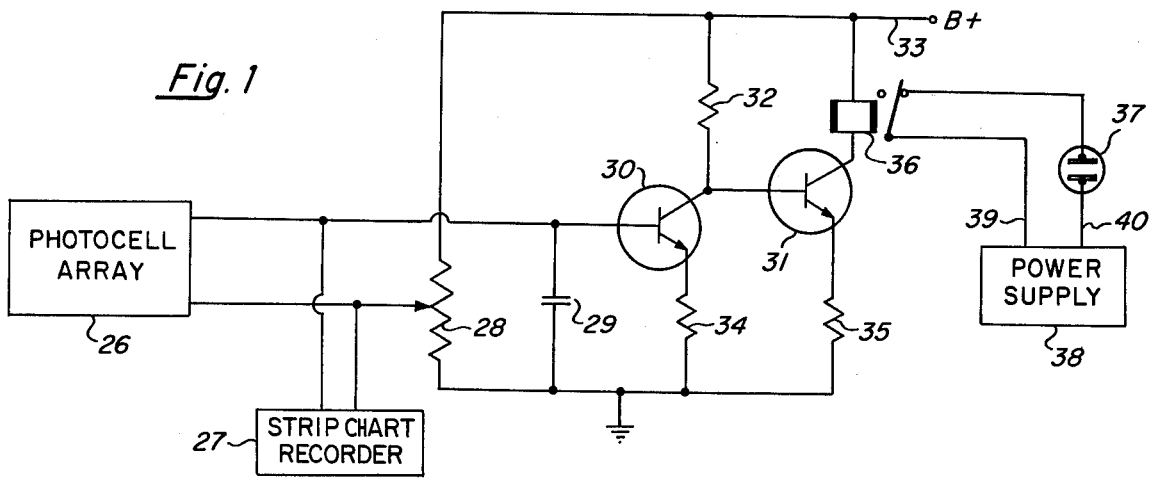
FIG. 1 is a schematic diagram of circuit utilized in connection with the invention.
Figure 2:
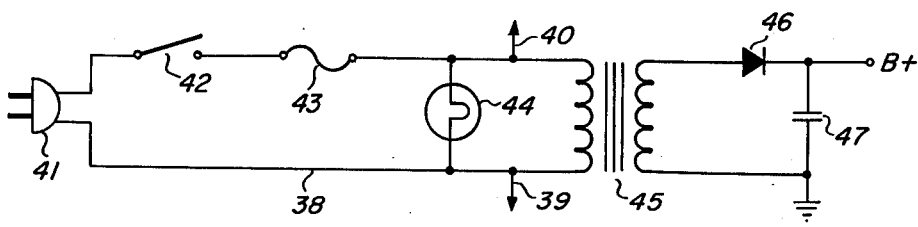
FIG. 2 is a schematic diagram of a power supply for use with the invention.
Figure 4:
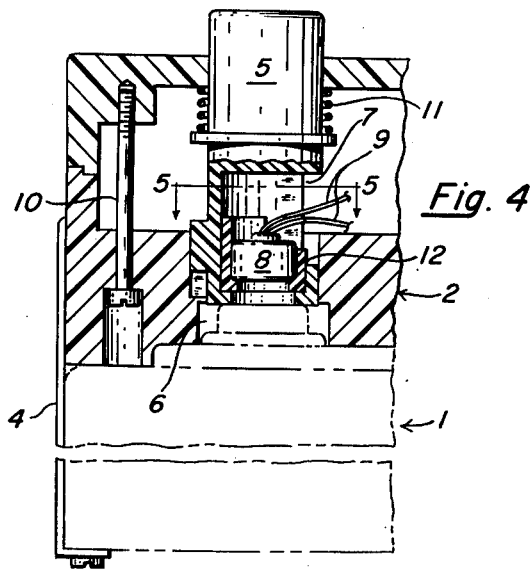
FIG. 4 is a section elevation view of one of the pistons shown in FIG. 3.
Figure 3:
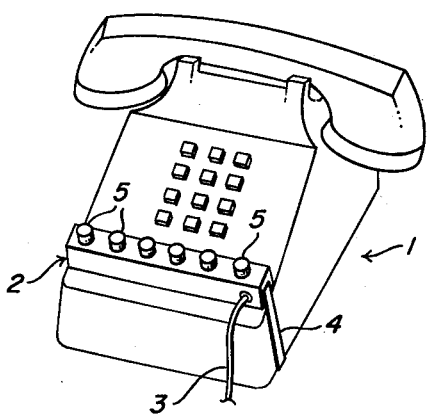
FIG. 3 is a perspective view of the mounting bracket containing a photocell array adapted for use with a telephone.
Figures 5, 6:
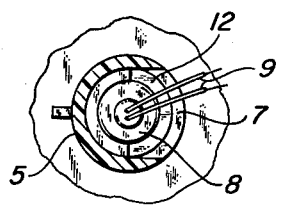
FIG. 5 is a section view taken along line 5-5 of FIG. 4.
FIG. 6 is a perspective view of the shim shown in FIG. 4.
Figure 7:
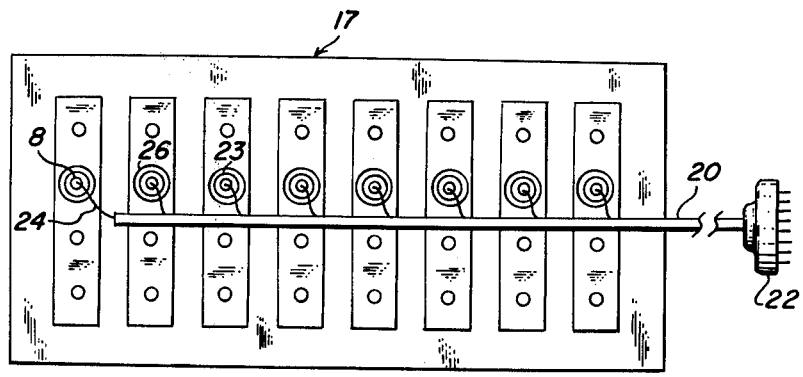
FIG. 7 is a side elevation view of an embodiment of the invention adapted for use with a data acquisition system.
Figure 8:
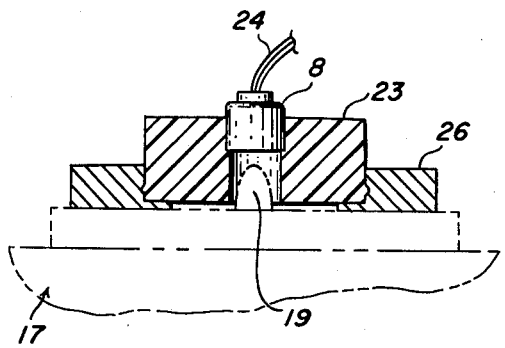
FIG. 8 is a side elevation view of one of the photocell elements and its mounting shown in FIG. 7.

FIGS. 1 and 2 depict circuitry that is to be used with the invention. In FIG. 1 two leads are connected to photocell array 26 which may be, according to the preferred form of the invention, the mounting bracket and its associated photocells for the telephone as shown in FIGS. 3, 4, and 5. The photocells are connected in series so that the resultant electrical output is a function of the number of lights which are illuminated on the front of the telephone. The signal is fed in parallel to two electrical networks. One such electrical network is shown to be a strip chart recorder 27 of any well known type. The strip chart recorder will give an indication as a function of time of the number of telephone lines in use. One lead from photocell array 26 is connected to potentiometer 28. The function of potentiometer 28 is to adjust the sensitivity of the photocell array for the ambient light conditions in the room such that the voltage level which trips relay 36 is independent of the relative light intensity in the room. This is accomplished by setting potentiometer 28 for an "all busy" indication under normal ambient light conditions. Thus relay 36 is triggered when the composite pilot light intensity and ambient light intensity cause the voltage on the base of transistor 30 to be greater than threshold voltage set by potentiometer 28 as explained herein. The other lead from photocell array 26 is connected to a two stage amplifier consisting of transistors 30 and 31. The output of transistor 31 is connected to the coil of relay 36. When the voltage level on the base of transistor 30 reaches the threshold set by potentiometer 28 current begins flow from collector to ground and the collector-ground voltage drops to an insignificant level relative to the B+ voltage. When this occurs bias is removed from the base of transistor 31 and current ceases to flow in the coil of relay 36. This in turn allows the contacts of relay 36 to return to their normally open position. When this occurs AC receptacle 37 is provided with current because lines 39 and 40 are connected to a source of AC power as shown in FIG. 2. Plugged into AC receptacle 37 may be an alarm (not shown) of any suitable type such as a light or buzzer or any combination thereof.

Current for the alarm is provided by the power supply of FIG. 2 which consists of AC plug 41, on-off switch 42, fuse 43, pilot light 44, stepdown transformer 45, rectifying diode 46, and smoothing capacitor 47. Lines 39 and 40 are connected to one side of the relay contacts of relay 36.

A special feature of the circuit depicted in FIG. 1 is the use of smoothing capacitor 29 which is connected to the base of transistor 30. This component integrates voltage pulses in the transistor 30 base circuit and therefore stabilizes the baseemitter voltage. This results in a stabilized voltage output to the recorder and also stabilizes the current in the relay circuit. Capacitor 29 is necessary to the circuit of FIG. 1 because rapidly fluctuating light intensity from photocell array 26 is frequently encountered in the application of this invention. One example of rapidly fluctuating light intensity occurs when a voice telephone caller is placed on open "hold." In this case, the light behind the key on the telephone instrument flashes on and off rapidly. The function of the capacitor is to dampen out the resulting voltage pulses in the transistor 30 base circuit and, therefore, prevent the flashing light from causing the recorder pin to jump. A second advantage to dampening these pulses is to prevent repetitive relay contact opening and closing with each fluctuation of the light intensity which could occur if the aggregate light intensity were near the threshold level of the alarm.

In order that photocell array 26 may be made inexpensive, portable, and easy to mount without using any internal connections to the telephone system, means are provided as shown in FIG. 3 for mounting the photocell array on a bracket which fits over the transparent light illuminated buttons of a conventional telephone. With such an arrangement, a transparent plastic case 2 containing photocells 8 are positioned in a holding bracket 4 over a standard telephone instrument 1. Cable 3 leading from the holding bracket connects the photocell array 26 to the circuitry described in FIG. 1. The bracket itself consists of two flanged clips which hold the transparent plastic case 2. Inside the case there are recesses 6 for the transparent telephone keys. Pistons 5 are inserted into holes in the transparent plastic case which contain the photocells 8; the piston 5 has a vertical slit 7 from which the cell leads may protrude and remain undistrubed as the piston is depressed and reset. Piston 5 is held against an outer casing 2 by means of a spring 11. Piston 5 is flanged on one side which flange rides inside a slot in case 2. The flange-slot arrangement keeps the photocell from rotating during operation. Piston 5 which is hollow has an opening in its side below the spring 11 and opposite the flange to permit the photocell and leads to be inserted. Insertion is facilitated by use of an inner shim 12 which rests inside piston 5. Photocell 8 is inserted into shim 12 and shim 12 is press fitted into piston 5. By use of the inner shim 12 photocells may easily be replaced without requiring any unusual dexterity in getting the photocells in and out of the piston. To further facilitate installation and repair case 2 may consist of an upper and lower part joined by a screw 10. The pistons and the case are both transparent so that there will be no blocking of the light from the telephone push-button keys. With such an arrangement, the clamp 4 is merely fitted over the telephone instrument to be monitored and the leads 9 are connected to the circuitry shown in FIG. 1.

According to another embodiment of the invention the photocells are inserted into a translucent plastic shim 23 which is fitted inside a doughnut shaped magnet 26. The magnet may then be placed over the light emitting diodes of multichannel data communications assembly 17. By the use of the clear plastic shim 23, the viewer is able to observe the light emitting diode activity in the data communications assembly and yet still be able to monitor the relative volume of information on each data channel. The leads 2A from the photocells 8 are connected to a cable 20 which in turn is connected to a plug 22.

It will be clear from the above description that various embodiments of the invention are capable of being adapted to particular environmental light emitting situations but in each case an inexpensive, portable monitoring system is provided which needs no internal connection to the telephone of data communication system. Accordingly the following invention is not intended to be limited to the precise structures shown but is to be described in the following appended claims.

I claim:

1. A light responsive monitoring system comprising:
   a. a mounting bracket placed over an array of illuminable line selector pushbuttons of a key telephone set having holes adapted to receive the pushbuttons;
   b. spring loaded pistons fitted into the holes in the mounting bracket and capable of vertical movement;
   c. removable inner shims slideably mounted into the holes in the mounting bracket between the piston and the pushbuttons;

d. photocells held within the shims and aligned normal to the pushbuttons;
e. recording means electrically coupled to the output of the photocells for recording the number of key telephone set lines in use as a function of time; and,
f. alarm triggering means electrically connected to the output of the photocells responsive to a preset threshold voltage level for indicating when all lines on the key telephone set are in use; said triggering means comprising means for adjusting the threshold voltage level to compensate for ambient lighting conditions.

2. A light responsive monitoring system as claimed in claim 1 wherein the alarm triggering means comprises a potentiometer coupled to an amplifier having a shunt capacitor between its input and ground potential and a relay connected to the output of the amplifier responsive to the current flow from the output of the amplifier.

* * * * *